US012548751B2

(12) United States Patent
Ueda et al.

(10) Patent No.: US 12,548,751 B2
(45) Date of Patent: Feb. 10, 2026

(54) QUADRUPOLE MASS SPECTROMETER

(71) Applicant: SHIMADZU CORPORATION, Kyoto (JP)

(72) Inventors: Manabu Ueda, Kyoto (JP); Hiroki Miyashiro, Kyoto (JP); Junichi Taniguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 326 days.

(21) Appl. No.: 18/559,161

(22) PCT Filed: May 31, 2021

(86) PCT No.: PCT/JP2021/020694
§ 371 (c)(1),
(2) Date: Nov. 6, 2023

(87) PCT Pub. No.: WO2022/254526
PCT Pub. Date: Dec. 8, 2022

(65) Prior Publication Data
US 2024/0087873 A1 Mar. 14, 2024

(51) Int. Cl.
*H01J 49/42* (2006.01)
*H01J 49/06* (2006.01)

(52) U.S. Cl.
CPC ........ *H01J 49/4215* (2013.01); *H01J 49/063* (2013.01)

(58) Field of Classification Search
CPC ....... H01J 49/4215; H01J 49/063; H01J 49/42
See application file for complete search history.

(56) References Cited

U.S. PATENT DOCUMENTS

2015/0102219 A1* 4/2015 Yamamoto ............ H01J 49/005 250/290
2017/0125230 A1 5/2017 Yoshinari et al.
2019/0035618 A1 1/2019 Ueda et al.
2019/0051508 A1 2/2019 Miyauchi et al.

FOREIGN PATENT DOCUMENTS

JP 6277272 B2 2/2018
JP 6418337 B2 11/2018
WO 2017/094146 A1 6/2017

OTHER PUBLICATIONS

Written Opinion (ISA237) for PCT application PCT/JP2021/020694 dated Aug. 24, 2021.

* cited by examiner

*Primary Examiner* — Robert H Kim
(74) *Attorney, Agent, or Firm* — Muir Patent Law, PLLC

(57) ABSTRACT

A quadrupole mass spectrometer includes a quadrupole mass filter including: a main rod portion including four main rod electrodes; a pre-rod portion including four pre-rod electrodes, where, at an end opposite to the main rod portion, the four pre-rod electrodes are disposed to be aligned on an inscribed circle having the same radius centered on the ion optical axis, and, at the other end facing the main rod portion, two pre-rod electrodes facing each other across the ion optical axis and the other two pre-rod electrodes are disposed to be aligned on an inscribed circle having different radii centered on the ion optical axis; a main voltage applying unit to apply, to each main rod electrode, a voltage created by superimposing a DC voltage and an RF voltage; and a pre-voltage applying unit to apply an RF voltage having a same frequency as the RF voltage to each pre-rod electrode.

10 Claims, 5 Drawing Sheets

QUADRUPOLE MASS SPECTROMETER

TECHNICAL FIELD

The present invention relates to a quadrupole mass spectrometer using a quadrupole mass filter as a mass separator. In the present specification, the "quadrupole mass spectrometer" includes not only a single-type quadrupole mass spectrometer but also a triple quadrupole mass spectrometer in which quadrupole mass filters are disposed in front and rear of a collision cell, or a quadrupole-time-of-flight mass spectrometer in which a quadrupole mass filter is disposed in front of the collision cell and a time-of-flight mass spectrometer is disposed in rear of the collision cell.

BACKGROUND ART

In a general single-type quadrupole mass spectrometer, ions derived from a component (compound) contained in a sample are separated by a quadrupole mass filter according to the mass-to-charge ratio (strictly speaking, it is represented by italicized "m/z", but is referred to herein as "mass-to-charge ratio" or "m/z"), and the separated ions are detected by an ion detector. When mass scanning is repeated over a range of a predetermined m/z in the quadrupole mass filter, it is possible to repeatedly acquire a mass spectrum indicating a relationship between m/z and an ionic intensity.

The quadrupole mass filter generally has a configuration in which four rod electrodes having a cylindrical outer shape are disposed, so as to be in contact with the outside of a circle (inscribed circle) having a predetermined radius centered on a straight line (central axis), in parallel to each other and at equal angular intervals (90°) in the circumferential direction. A voltage of +(U+V cos ωt) created by superimposing a radio-frequency (RF) voltage V cos ωt on a DC voltage U is applied to two rod electrodes facing each other across the central axis, which is also an ion optical axis, and a voltage of −(U+V cos ωt) created by superimposing a phase-inverted RF voltage −V cos ωt on an opposite polarity DC voltage −U is applied to the other two rod electrodes. Setting the voltage value U of the DC voltage and the amplitude value V of the RF voltage to predetermined values corresponding to m/z, ions having m/z can pass through the quadrupole mass filter selectively.

Near both ends of the rod electrodes, the electric field is disturbed, and the disturbance of the electric field is one of the factors causing a decrease in ion passing efficiency. Therefore, to reduce such disturbance of the rod end electric field, pre-rod electrodes are often provided in front of the rod electrodes for selecting ions (hereinafter referred to as "main rod electrodes"), or post-rod electrodes are often provided in rear of the main rod electrodes. In general, each of the pre-rod electrodes and the post-rod electrodes is a rod electrode having the same diameter as that of the main rod electrode, having a cylindrical outer shape, and being short in the ion optical axis direction. The pre-rod electrodes and the post-rod electrodes need to converge ions having a wide range of m/z. Therefore, in general, the DC voltage U is not applied to these electrodes, and an RF voltage having the same frequency and a smaller amplitude as the RF voltage applied to the main rod electrodes is applied.

CITATION LIST

Patent Literature

Patent Literature 1: WO 2017/094146 A
Patent Literature 2: JP 6418337 B2
Patent Literature 3: JP 6277272 B2

SUMMARY OF INVENTION

Technical Problem

In a quadrupole mass spectrometer provided with pre-rod electrodes, generally, ions derived from a sample component are introduced into a space surrounded by the four pre-rod electrodes (hereinafter referred to as "pre-rod space") through a small aperture (opening) disposed in front of the pre-rod electrodes. Typically, the shape of the aperture is circular centering on the central axis. Therefore, ions having passed through the aperture enter the pre-rod space while spreading conically. Then, the ions move the pre-rod space, exit the pre-rod space and are introduced into a space surrounded by the four main rod electrodes (hereinafter referred to as "main rod space").

Taking the direction of the ion optical axis as Z axis, and the other two axes orthogonal to each other and orthogonal to Z axis as X axis and Y axis, a voltage +(U+V cos ωt) is applied to two main rod electrodes located in the X-axis direction, and a voltage −(U+V cos ωt) is applied to the other two main rod electrodes located in the Y-axis direction. In this case, considering the DC potential distribution in the Z-axis direction on the Y-Z plane, the DC potential is zero in the pre-rod space and the DC potential is negative in the main rod space, and thus the DC potential distribution brings about acceleration and convergence actions on positive ions moving from the pre-rod space to the main rod space. In contrast, considering the DC potential distribution in the Z-axis direction on the X-Z plane, the DC potential is zero in the pre-rod space and the DC potential is positive in the main rod space, and thus the DC potential distribution causes deceleration and divergence actions on positive ions moving from the pre-rod space to the main rod space. Due to such a divergence action, some of the ions disappear when moving from the pre-rod space to the main rod space, which may be one of the factors causing a decrease in analysis sensitivity.

To reduce the influence of the difference in action due to the DC potential distribution on the Y-Z plane and the X-Z plane as described above, the following method is conventionally known.

Patent Literature 1 describes a mass spectrometer in which the radius of the inscribed circle of the pre-rod electrodes or a cross-sectional shape of a curved surface of the pre-rod electrodes facing the ion optical axis is made different between the pre-rod electrodes positioned in the X-axis direction and the other pre-rod electrodes positioned in the Y-axis direction, or amplitudes of RF voltages to be applied are made different between the pre-rod electrodes positioned in the X-axis direction and the pre-rod electrodes positioned in the Y-axis direction.

Patent Literature 2 describes a mass spectrometer in which each pre-rod electrode is divided into a plurality of segments in an ion optical axis direction and then separated from each other, and different RF voltages are applied to the plurality of segments.

Patent Literature 3 describes a mass spectrometer using main rod electrodes having an end surface shape inclined with respect to a plane orthogonal to an ion optical axis such that an inscribed circle radius of an end on an ion inlet side of each main rod electrode is larger than an inscribed circle radius of the other end.

In the mass spectrometer described in Patent Literature 1, the passing efficiency of ions in the boundary region between the pre-rod space and the main rod space can be improved. In contrast, the electric field at the ion inlet of the pre-rod space is asymmetric around the ion optical axis, and thus the efficiency of receiving ions entering the pre-rod space through the aperture is not necessarily good, and there is room for improvement in terms of the overall ion passing efficiency of the quadrupole mass filter.

In the mass spectrometer described in Patent Literature 2, the passing efficiency of ions in the boundary region between the pre-rod space and the main rod space can be improved, and the electric field at the inlet of the pre-rod space can be made symmetric around the ion optical axis, so that a decrease in the ion passing efficiency at the inlet of the pre-rod space can also be suppressed. However, different voltages are applied to a plurality of segments constituting each pre-rod electrode, and thus the power supply unit becomes complicated, causing such a problem in that an increase in size and weight of the power supply unit or an increase in cost cannot be avoided.

In addition, in the mass spectrometer described in Patent Literature 3, a part of the main rod electrodes, which require extremely high dimensional accuracy, is machined, and thus there is such a problem in that a large amount of time and effort is required for the machining and the cost increases.

As described above, in the conventional mass spectrometer, improvement in the ion passing efficiency in the ion incident region in the quadrupole mass filter brings about problems such as an increase in cost. The same problems arise in the ion emission region when the post-rod electrodes are disposed, and it is desired to improve the ion passing efficiency while suppressing the cost.

The present invention has been made to solve the above problems, and a main object of the present invention is to provide a quadrupole mass spectrometer capable of improving analysis sensitivity by improving overall ion passing efficiency in a quadrupole mass filter while suppressing an increase in cost and an increase in size and weight of a power supply unit.

Solution to Problem

One mode of a quadrupole mass spectrometer according to the present invention made to solve the above problems includes a quadrupole mass filter configured to separate ions to be measured according to a mass-to-charge ratio, the quadrupole mass filter including:

- a main rod portion including four main rod electrodes disposed to surround an ion optical axis;
- a pre-rod portion including four pre-rod electrodes respectively disposed in front of the four main rod electrodes along the ion optical axis, where, at an end opposite to the main rod portion, the four pre-rod electrodes are disposed so as to be aligned on an inscribed circle having the same radius centered on the ion optical axis, and, at the other end facing the main rod portion, two pre-rod electrodes facing each other across the ion optical axis and the other two pre-rod electrodes are disposed so as to be aligned on an inscribed circle having different radii centered on the ion optical axis;
- a first voltage applying unit configured to apply, to each of the four main rod electrodes, a voltage created by superimposing a DC voltage and an RF voltage according to a mass-to-charge ratio of ions to be allowed to pass; and
- a second voltage applying unit configured to apply an RF voltage having the same frequency as the RF voltage to each of the four pre-rod electrodes.

Another mode of a quadrupole mass spectrometer according to the present invention made to solve the above problems includes a quadrupole mass filter configured to separate ions to be measured according to a mass-to-charge ratio, the quadrupole mass filter including:

- a main rod portion including four main rod electrodes disposed to surround an ion optical axis;
- a post-rod portion including four post-rod electrodes respectively disposed in rear of the four main rod electrodes along the ion optical axis, where, at an end opposite to the main rod portion, the four post-rod electrodes are disposed so as to be aligned on an inscribed circle having the same radius centered on the ion optical axis, and, at an end facing the main rod portion, two post-rod electrodes facing each other across the ion optical axis and the other two post-rod electrodes are disposed so as to be aligned on an inscribed circle having different radii centered on the ion optical axis;
- a first voltage applying unit configured to apply, to each of the four main rod electrodes, a voltage created by superimposing a DC voltage and an RF voltage according to a mass-to-charge ratio of ions to be allowed to pass; and
- a second voltage applying unit configured to apply an RF voltage having the same frequency as the RF voltage to each of the four post rod electrodes.

Advantageous Effects of Invention

In the above two modes of the quadrupole mass spectrometer according to the present invention, the ion passing efficiency is improved in any of: an inlet region where ions enter the pre-rod portion, a boundary region where ions move from the pre-rod portion to the main rod portion, a boundary region where ions move from the main rod portion to the post-rod portion, and an outlet region where ions exit from the post-rod portion. As a result, the overall ion passing efficiency of the quadrupole mass filter is improved, and the analysis sensitivity can be improved as compared with the conventional mass spectrometer.

In addition, in the above two modes of the quadrupole mass spectrometer according to the present invention, it is not necessary to prepare a plurality of types of RF voltages to be applied to the rod electrodes included in the pre-rod portion and the post-rod portion, and thus the power supply unit is not complicated, and it is possible to avoid both an increase in size and weight of the power supply unit and an increase in cost. In addition, special machining or formation in manufacturing is not required for the main rod electrodes, and thus an increase in cost can also be avoided in that respect.

BRIEF DESCRIPTION OF DRAWINGS

FIG. 2A is an end view on an X-Z plane including an ion optical axis C, and FIG. 2B is an end view on a Y-Z plane including the ion optical axis C.

FIG. 4A is an end view on the X-Z plane including the ion optical axis C, and FIG. 4B is an end view on the Y-Z plane including the ion optical axis C.

DESCRIPTION OF EMBODIMENTS

A quadrupole mass spectrometer according to the present invention can be applied to all mass spectrometers using a quadrupole mass filter as a mass separator. Therefore, the quadrupole mass spectrometer according to the present invention includes a single-type quadrupole mass spectrometer, a triple quadrupole mass spectrometer, and a quadrupole-time-of-flight mass spectrometer.

Hereinafter, a triple quadrupole mass spectrometer as an embodiment of the present invention is described with reference to the attached drawings.

Figure 1:
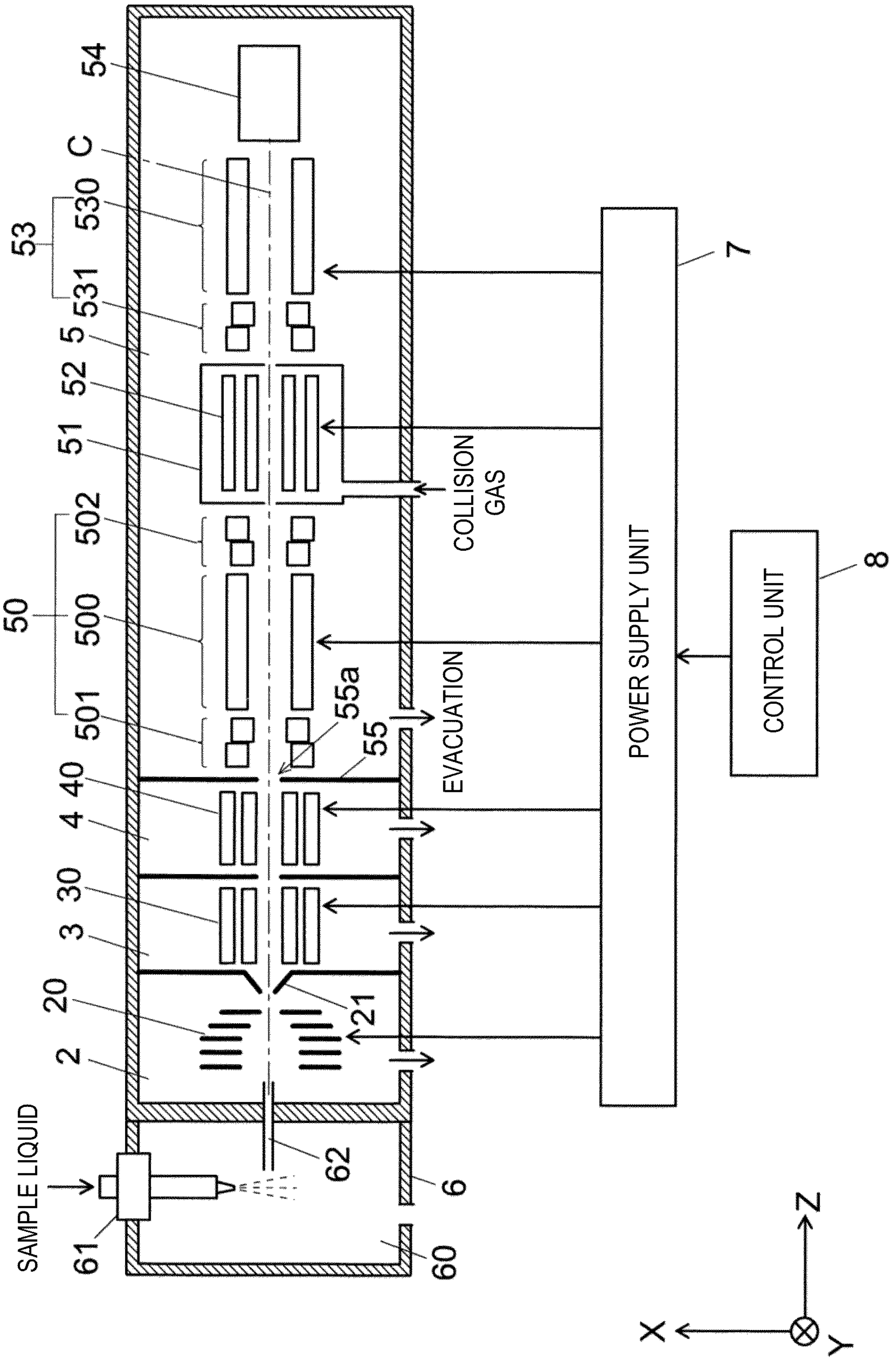
FIG. 1 is a schematic overall configuration view of a triple quadrupole mass spectrometer according to one embodiment of the present invention.

FIG. 1 is a schematic overall configuration view of a triple quadrupole mass spectrometer of the present embodiment. This mass spectrometer is a triple quadrupole mass spectrometer using an atmospheric pressure ion source, and is generally combined with a liquid chromatograph to be used as a liquid chromatograph mass spectrometer (LC-MS).

In this mass spectrometer, an ionizer 6 in which an ionization chamber 60 is provided is connected to the front of a vacuum chamber 1. The inside of the vacuum chamber 1 is roughly divided into four chambers of a first intermediate vacuum chamber 2, a second intermediate vacuum chamber 3, a third intermediate vacuum chamber 4, and an analysis chamber 5. The ionization chamber 60 has a substantially atmospheric pressure, and each chamber after the first intermediate vacuum chamber 2 is evacuated by a rotary pump and a turbo molecular pump (not illustrated). As a result, this mass spectrometer has a configuration of a multi-stage differential exhaust system in which the degree of vacuum increases stepwise from the ionization chamber 60 to the first intermediate vacuum chamber 2, the second intermediate vacuum chamber 3, the third intermediate vacuum chamber 4, and the analysis chamber 5 in this order.

An electrospray ionization (ESI) probe 61 is disposed in the ionization chamber 60, and the ionization chamber 60 and the first intermediate vacuum chamber 2 communicate with each other through a desolvation tube 62 heated to a high temperature. An ion guide 20 called a Q-array is disposed in the first intermediate vacuum chamber 2, and the first intermediate vacuum chamber 2 and the second intermediate vacuum chamber 3 communicate with each other through a small hole provided at the top of a skimmer 21. In each of the second intermediate vacuum chamber 3 and the third intermediate vacuum chamber 4, multipole ion guides 30 and 40 including a plurality of rod electrodes disposed to surround the ion optical axis C are disposed.

In the analysis chamber 5, a front quadrupole mass filter 50, a collision cell 51 including an ion guide 52 configured to transport ions while converging the ions, a rear quadrupole mass filter 53, and an ion detector 54 configured to output an ionic intensity corresponding to the amount of the incident ions as a detection signal are disposed along the ion optical axis C.

Predetermined voltages are applied from the power supply unit 7 to an ESI probe 61, the desolvation tube 62, the ion guides 20, 30, 40, and 52, the quadrupole mass filters 50 and 53, and the like under the control of a control unit 8. In addition, although not illustrated to avoid complexity, predetermined voltages are also applied to the components such as the ESI probe 61 and the desolvation tube 62. A detection signal by the ion detector 54 is converted into digital data by an analog-to-digital converter (not illustrated) and input to a data processing unit (not illustrated).

A typical MS/MS analysis operation in the mass spectrometer of the present embodiment is schematically described.

When a sample liquid is introduced into the ESI probe 61, charged sample droplets are nebulized into the ionization chamber 60 from the tip of the ESI probe 61, and the charged droplets collide with surrounding gas to be refined, and during vaporization of the solvent in the droplets, the component molecules contained in the sample liquid are ionized. The generated ions are sucked into the desolvation tube 62 together with the charged droplets in which the solvent is not sufficiently vaporized, and sent to the first intermediate vacuum chamber 2. The vaporization of the solvent in the droplets in the desolvation tube 62 is further promoted, whereby the generation of ions derived from the sample components is promoted.

The ions introduced into the first intermediate vacuum chamber 2 are converged near the small hole of the skimmer 21 by the action of the electric field formed by the ion guide 20, pass through the small hole, and enter the second intermediate vacuum chamber 3. The ions are sequentially transported while being converged by the action of the electric field formed by the ion guides 30 and 40, and enter the analysis chamber 5 through an aperture 55*a* formed in a partition wall 55 separating the third intermediate vacuum chamber 4 and the analysis chamber 5.

In the analysis chamber 5, ions derived from the sample component first enter the front quadrupole mass filter 50, and only ions having m/z corresponding to the voltage applied to the electrodes constituting the front quadrupole mass filter 50 pass through the front quadrupole mass filter 50. Ions (precursor ions) having passed through the front quadrupole mass filter 50 are incident on the collision cell 51 and collide with collision gas (inert gas, typically argon, nitrogen, and the like) introduced into the collision cell 51, to generate collision-induced dissociation (CID). Various product ions generated by the CID are transported while being converged by the ion guide 52, and are incident on the rear quadrupole mass filter 53. Only product ions having m/z corresponding to the voltage applied to the rod electrodes constituting the rear quadrupole mass filter 53 pass through the rear quadrupole mass filter 53 and are incident on the ion detector 54. The ion detector 54 outputs an ionic intensity signal having a magnitude corresponding to the amount of incident ions.

Ions having predetermined m/z are selectively passed through the front quadrupole mass filter 50 and the rear quadrupole mass filter 53, which allows to detect specific product ions derived from specific components in the sample.

As illustrated in FIG. 1, the front quadrupole mass filter 50 includes a main rod portion 500, a pre-rod portion 501 disposed in front of the main rod portion 500, and a post-rod portion 502 disposed behind the main rod portion, with the main rod portion interposed between them. In contrast, the rear quadrupole mass filter 53 includes a main rod portion 530 and a pre-rod portion 531 disposed in front of the main rod portion 530. The main rod portions 500 and 530 in the quadrupole mass filters 50 and 53 have a function of selecting ions according to m/z, and the pre-rod portions 501 and 531 and the post-rod portion 502 mainly have a function of reducing disturbance of the edge electric field of the main rod portions 500 and 503.

Figure 2A:
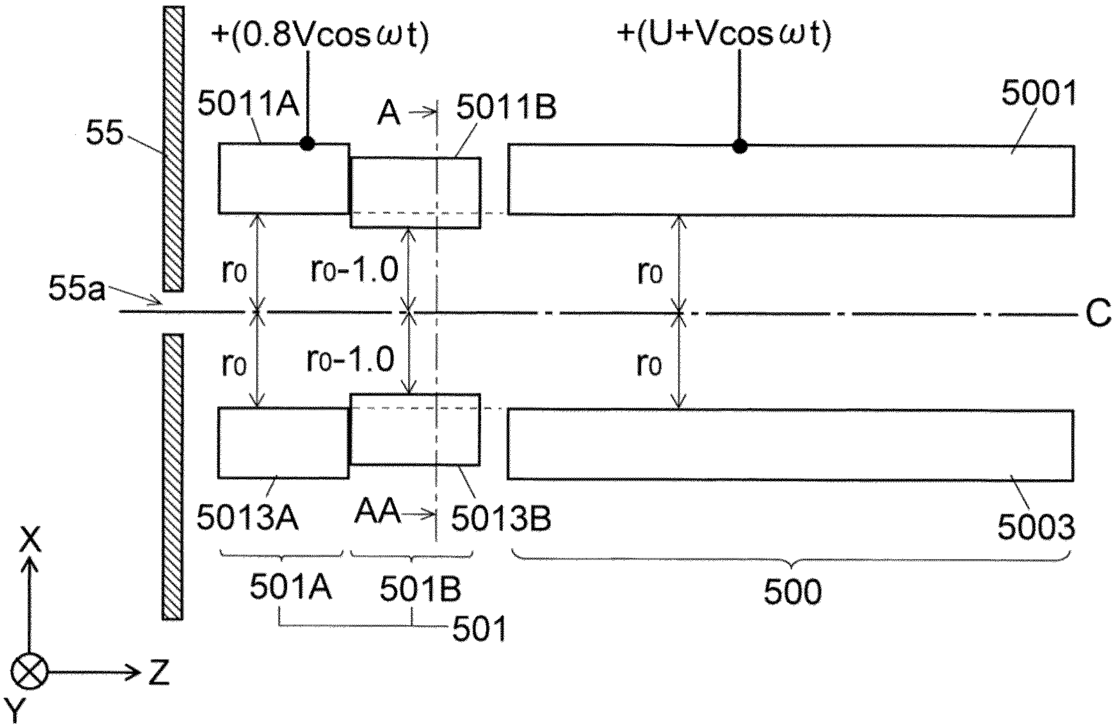
FIGS. 2A and 2B are views each illustrating a configuration of a first half portion of a front quadrupole mass filter in the mass spectrometer of the present embodiment, where
Figure 2B:
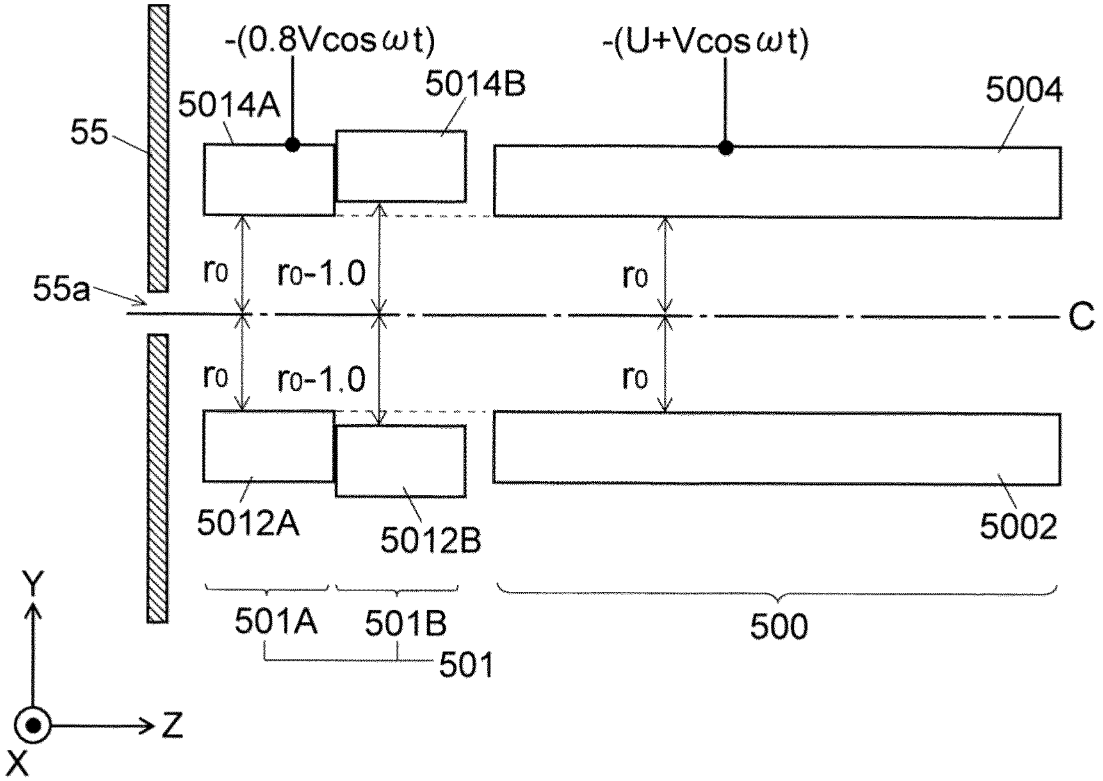
Figure 3:
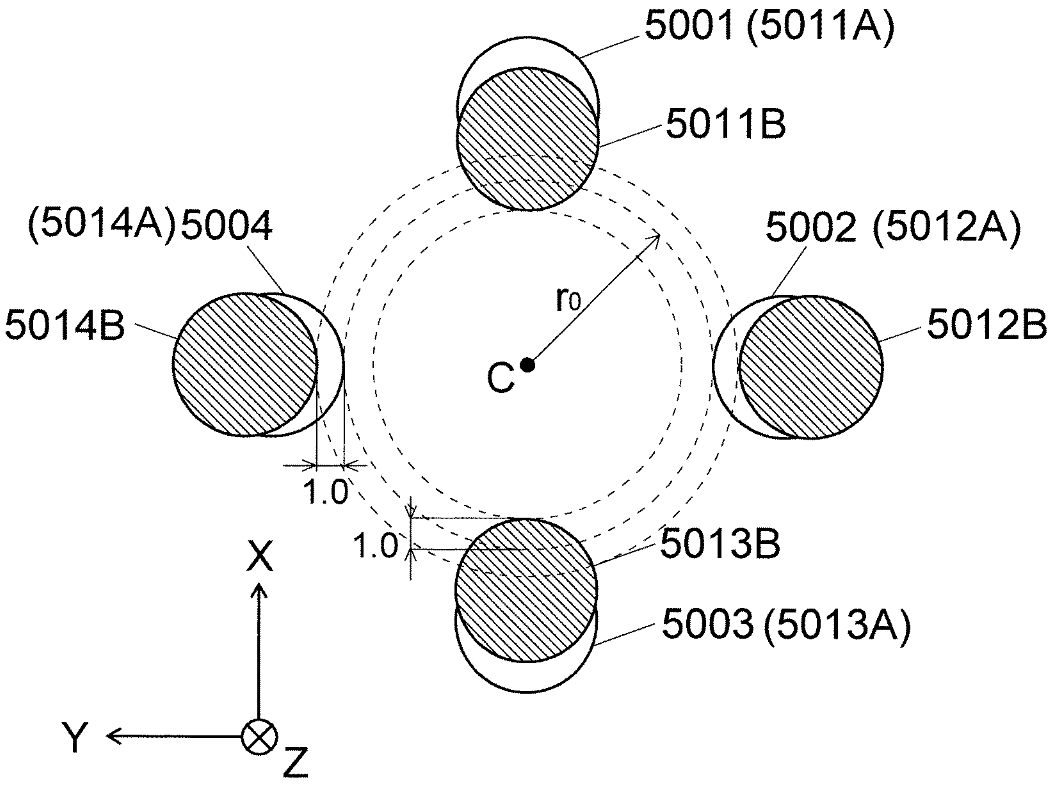
FIG. 3 is a cross-sectional view taken along line A-AA in FIG. 2A.

Then, characteristic configurations and operations of the quadrupole mass filters 50 and 53 are described with reference to FIGS. 2A and 2B and FIG. 3. Herein, positive ions are assumed to be measured. FIGS. 2A and 2B are views each illustrating a configuration of a substantially first half portion of the front quadrupole mass filter 50, where FIG. 2A is an end view on an X-Z plane including the ion optical axis C, and FIG. 2B is an end view on a Y-Z plane including the ion optical axis C. FIG. 3 is a cross-sectional view taken along line A-AA in FIG. 2A, that is, a schematic cross-sectional view of the pre-rod portion 501 on an X-Y plane orthogonal to the ion optical axis C.

Similarly to a general quadrupole mass filter, the main rod portion 500 includes four main rod electrodes 5001, 5002, 5003, and 5004 having a cylindrical outer shape, and the four main rod electrodes 5001 to 5004 are disposed in parallel with each other and at equal angular intervals in the circumferential direction so as to be aligned on an inscribed circle having a radius $r_0$ centered on the ion optical axis C. Among the four main rod electrodes 5001 to 5004, a voltage $+(U+V \cos \omega t)$ is applied from the power supply unit 7 to the two rod electrodes 5001 and 5003 facing each other across the ion optical axis C in the X-axis direction, and a voltage $-(U+V \cos \omega t)$ is applied from the power supply unit 7 to the two rod electrodes 5002 and 5004 facing each other across the ion optical axis C in the Y-axis direction. U is a DC voltage, $V \cos \omega t$ is an RF voltage, and U and V have a constant relationship and change according to m/z. A DC bias voltage may be commonly applied to each main rod electrode, but the DC bias voltage does not contribute to ion separation, and thus is not taken into consideration here.

In the conventional mass spectrometer, generally, a rod electrode shorter than the main rod electrode in the Z-axis direction is used for the pre-rod portion, and each of the four shorter rod electrodes is disposed in front of the main rod electrode. That is, the four pre-rod electrodes are disposed at equal angular intervals in the circumferential direction so as to be aligned on an inscribed circle having a radius $r_0$, similarly to the main rod electrodes. In contrast, in the quadrupole mass filter 50 of the present embodiment, the pre-rod portion 501 is divided into two portions of a first segment portion 501A and a second segment portion 501B in the direction of the ion optical axis C.

Specifically, each pre-rod electrode 5011 to 5014 is cut near the center in the direction of the ion optical axis C to be divided into first segments 5011A to 5014A and second segments 5011B to 5014B. One pre-rod electrode, for example, the pre-rod electrode 5011 includes the first segment 5011A and the second segment 5011B, and the second segment 5011B is displaced inward (in a direction approaching the ion optical axis C) by 1 mm in the radial direction (in the X-Y plane in FIGS. 2A and 2B) in a state where electrical contact between the first and second segments is maintained. The same applies to the pre-rod electrode 5013 facing across the ion optical axis C. In contrast, the other two pre-rod electrodes, for example, the pre-rod electrode 5014 is made of the first segment 5014A and the second segment 5014B, and the second segment 5011B is displaced outward (in the direction away from the ion optical axis C) by 1 mm in the radial direction (in the X-Y plane in FIGS. 2A and 2B) while electrical contact between the first and second segments is maintained. The same applies to the pre-rod electrode 5012 facing across the ion optical axis C.

In other words, as illustrated in FIG. 3, the first segments 5011A to 5014A of the respective pre-rod electrodes 5011 to 5014 are disposed so as to be aligned on an inscribed circle having a radius $r_0$. In contract, among the second segments 5011B to 5014B of the respective pre-rod electrodes 5011 to 5014, the second segments 5011B and 5013B disposed in the X-axis direction (refer to FIG. 2A) are disposed so as to be aligned on an inscribed circle having a radius $r_0$-1 mm smaller than the radius $r_0$ of the above-described inscribed circle by 1 mm, and the second segments 5012B and 5014B disposed in the Y-axis direction (refer to FIG. 2B) are disposed so as to be aligned on an inscribed circle having a radius $r_0$+1 mm larger than the radius $r_0$ of the above-described inscribed circle by 1 mm. As described above, a level difference of 1 mm is provided between the first segments 5011A to 5014A and the corresponding one of the second segments 5011B to 5014B.

However, the inscribed circle with which the first segments 5011A to 5014A of the pre-rod electrodes 5011 to 5014 are in contact and the inscribed circle with which the main rod electrodes 5001 to 5004 are in contact do not necessarily have the same radius.

Although the value of $r_0$ can be appropriately determined, $r_0$ is about 4 mm in this example. In addition, a level difference of 1 mm between the segments is not limited to this. The values illustrated herein result from optimization using SIMION (registered trademark) manufactured by U.S. Scientific Instrument Services, which is well known as ion optical design simulation software, but it is well known that the values can vary depending on conditions.

Ions enter a pre-rod space surrounded by the pre-rod electrode 5011 to 5014 having the above configuration through the aperture 55*a*. The first segments 5011A to 5014A of the pre-rod electrodes 5011 to 5014 are aligned on the inscribed circle having the same radius, and thus the RF electric field at the inlet of the pre-rod space is substantially the same as that in the conventional case, and the RF electric field in the X-Y plane is symmetric around the ion optical axis C. Therefore, ions that enter through the circular aperture 55*a* and spread in a substantially conical shape, that is, exist substantially symmetrically around the ion optical axis C, are received in the pre-rod space well, that is, with high efficiency.

No DC voltage is applied to the pre-rod electrodes 5011 to 5014, and thus the DC potential in the pre-rod space is 0, whereas the DC potential in the main rod space of the next stage is a negative value in the Y-axis direction and a positive value in the X-axis direction. Therefore, in the vicinity of the boundary between the pre-rod space and the main rod space, a force of accelerating and converging positive ions in the direction of the ion optical axis C acts in the Y-axis direction. Conversely, in the X-axis direction, a force of decelerating and diverging positive ions in the ion optical axis C direction acts. In contrast, in the pre-rod electrodes 5011 to 5014, the second segments 5012B and 5014B located in the Y-axis direction have a relatively long distance from the ion optical axis C, and the second segments 5011B and 5013B located in the X-axis direction have a relatively short distance from the ion optical axis C. Therefore, a stronger convergence action acts on the positive ions passing through the space surrounded by the second segments 5011B to 5014B in the X-axis direction, and conversely, the convergence action weakens in the Y-axis direction.

That is, although completely opposite forces, that is, deceleration plus divergence and acceleration plus convergence act on positive ions moving from the pre-rod space to the main rod space in the X-axis direction and the Y-axis direction due to the U voltage applied to the main rod electrodes 5001 to 5004 as described above, displacing the positions of the second segments 5011B to 5014B of the pre-rod electrodes 5011 to 5014 in the radial direction alleviates both the effects of deceleration plus divergence and acceleration plus convergence described above. This action of deceleration and divergence may cause ions entering the main rod space to be not properly received in the main rod space and lost. Contrary to this, in the mass spectrometer of the present embodiment, ions can be moved from the pre-rod space to the main rod space with high efficiency.

While the second segments 5011B and 5013B disposed in the X-axis direction may be disposed so as to be aligned on an inscribed circle having a radius of $r_0$-1 mm, the second segments 5012B and 5014B disposed in the Y-axis direction may be disposed so as to be aligned on an inscribed circle having a radius of $r_0$. In this case, the two pre-rod electrodes 5012 and 5014 visible in FIG. 2B are not divided into two segments. Even in such a configuration, the action of deceleration and divergence acting on positive ions moving from the pre-rod space to the main rod space due to the U voltage is alleviated, and thus the ion passing efficiency can be improved. However, for the following reasons, the radius of the inscribed circle of the second segments 5012B and 5014B disposed in the Y-axis direction is preferably larger than $r_0$.

If the radius of the inscribed circle of the second segments 5011B and 5013B is set to be smaller than $r_0$, the effects of acceleration and convergence are enhanced but the space in which ions can be captured is narrowed, and thus the space charge effect is enhanced. If the radius of the inscribed circle of the second segments 5012B and 5014B is larger than $r_0$, the space in which ions can be captured expands in the Y-axis direction. Therefore, the enhancement in the space charge effect due to the narrowing of the space in which ions can be captured in the X-axis direction is alleviated in the Y-axis direction, and the divergence of ions due to the space charge effect can be suppressed. As a result, setting the radius of the inscribed circle of the second segments 5012B and 5014B disposed in the Y-axis direction to be more than $r_0$, rather than equal to $r_0$, improves the overall ion passing efficiency.

Figure 4A:
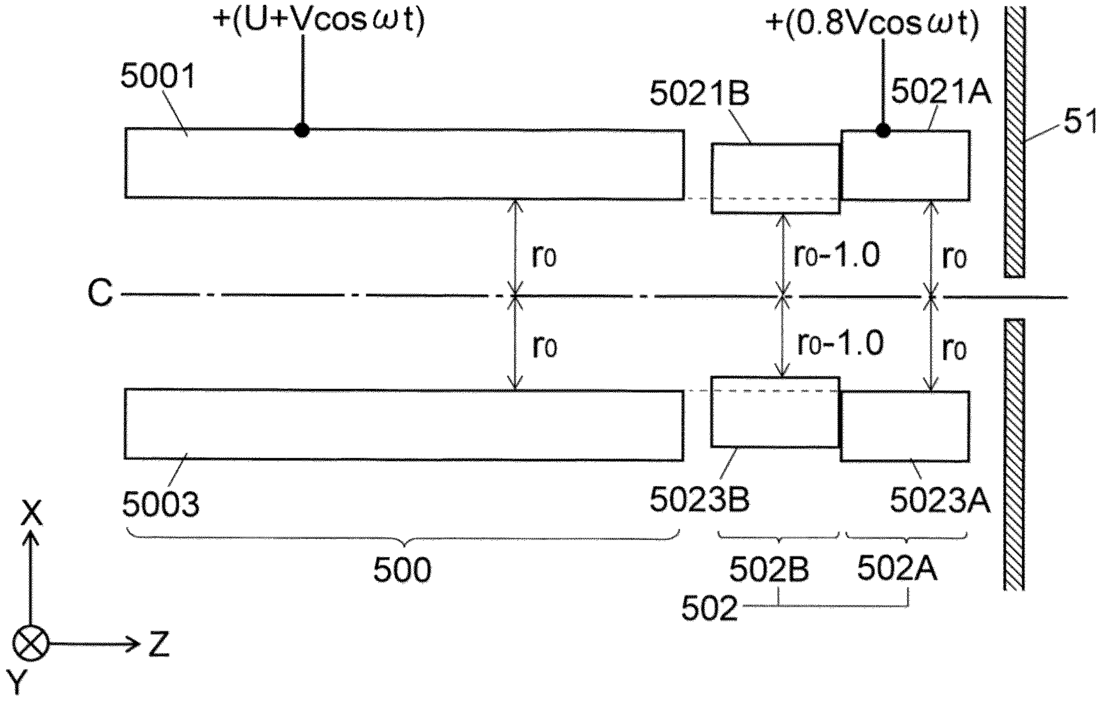
FIGS. 4A and 4B are views each illustrating a configuration of a last half portion of the front quadrupole mass filter in the mass spectrometer of the present embodiment, where
Figure 4B:
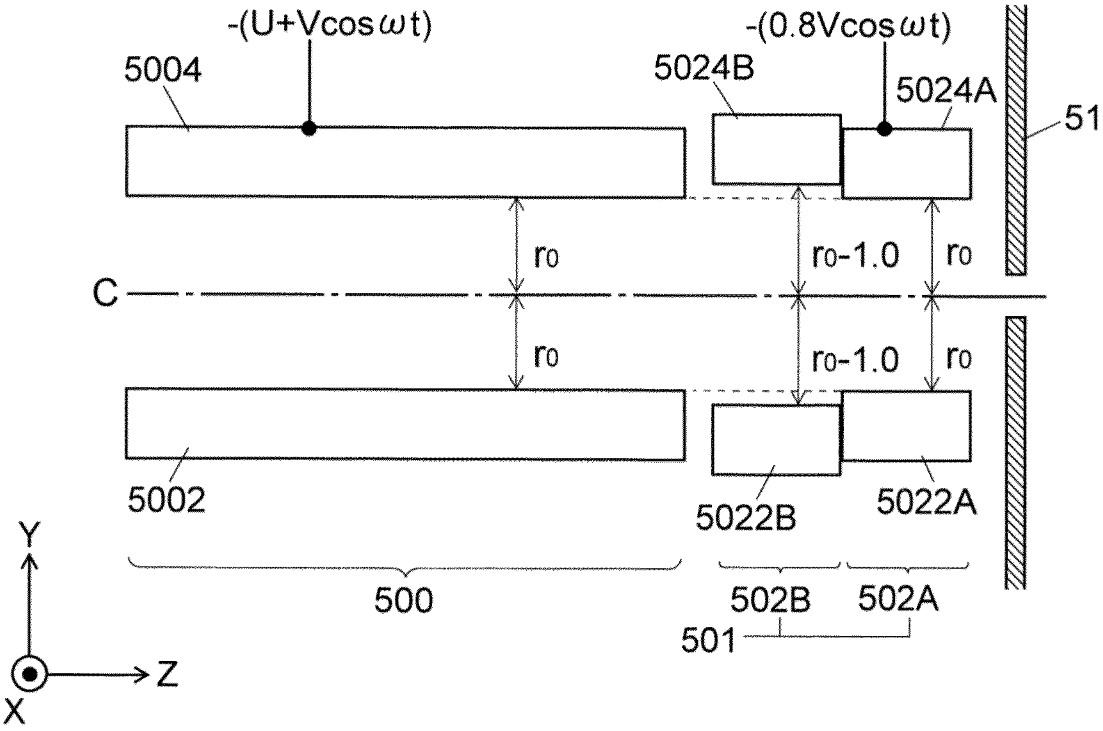

FIGS. 4A and 4B are views each illustrating a configuration of a substantially last half portion of the front quadrupole mass filter 50, where FIG. 4A is an end view on the X-Z plane including the ion optical axis C, and FIG. 4B is an end view on the Y-Z plane including the ion optical axis C. The post-rod electrodes 5021 to 5024 basically have the same configuration and disposition as those of the pre-rod electrodes 5011 to 5014, and the second segments 5021B to 5024B of the respective post-rod electrodes 5021 to 5024 are disposed so as to be aligned on an inscribed circle having a radius $r_0$. In contrast, among the first segments 5021A to 5024A of the respective post-rod electrodes 5021 to 5024, the first segments 5021A and 5023A (refer to FIG. 4A) disposed in the X-axis direction are disposed so as to be aligned on an inscribed circle having a radius of $r_0$-1 mm, and the first segments 5022A and 5024A (refer to FIG. 4B) disposed in the Y-axis direction are disposed so as to be aligned on an inscribed circle having a radius of $r_0$+1 mm.

The reason why the passing efficiency of ions moving from the main rod space to the post-rod space is improved by the above configuration is difficult to be explained by the reason why the passing efficiency of ions moving from the pre-rod space to the main rod space is improved as described above. This is because, when attention is paid to the behavior of ions under the DC electric field formed by the U voltage applied to the main rod electrode, the disposition of the post-rod electrodes as described above is not necessarily appropriate, but in practice, obvious improvement in ion detection sensitivity is observed (refer to Experimental Example described later).

The reason why the ion passing efficiency is improved by the disposition of 5021 to 5024 as shown in FIGS. 4A and 4B is presumed to be as follows.

When ions pass through the main rod space of the quadrupole mass filter, the ions move in the Z-axis direction while vibrating in the X-axis direction and the Y-axis direction. Simulation analysis of the trajectory of the ions in the main rod space by the inventors of the present invention has found that the amplitude of the vibration of the ions is different between the X-axis direction and the Y-axis direction, and the amplitude in the X-axis direction is larger than in the Y-axis direction (however, the average ion trajectory is closer to the ion optical axis in the X-axis direction than in the Y-axis direction). This suggests that it is more difficult to converge the ions passing through the main rod space in the X-axis direction than in the Y-axis direction, and it is considered that the ions are more likely to diverge in the X-axis direction than in the Y-axis direction when the ions move from the main rod space to the post-rod space.

In contrast, as illustrated in FIGS. 4A and 4B, disposing the first segments 5021A to 5024A of the post-rod electrodes 5021 to 5024 can provide a stronger ion convergence action in the X-axis direction. As a result, ions that are likely to diverge when emitted from the main rod space can be reliably received in the post-rod space, and reducing ion loss can improve the ion passing efficiency. In contrast, the second segments 5021B to 5024B on the side far from the main rod portion 500 in the post-rod electrodes 5021 to 5024 are aligned on the inscribed circle having the same radius $r_0$, and thus the emission of the ions from the post-rod portion 502 is performed with high efficiency as in the conventional case.

As described above, in the front quadrupole mass filter 50, ions can be passed with high efficiency in all of the following stages: a stage in which ions are incident on the pre-rod portion 501, a stage in which ions move from the pre-rod portion 501 to the main rod portion 500, a stage in which ions move from the main rod portion 500 to the post-rod portion 502, and a stage in which ions are emitted from the post-rod portion 502, and thus overall high ion passing efficiency can be achieved.

The rear quadrupole mass filter 53 includes only the pre-rod portion 531, but the configuration of the pre-rod portion 531 is set to be similar to that of the pre-rod portion 501 of the front quadrupole mass filter 50, which allows to achieve overall high ion passing efficiency.

The above description is a case where positive ions are to be measured. In a case where negative ions are to be measured, if the DC potential in the main rod space is a positive value, an action of accelerating and converging the ions in the ion optical axis C direction acts at the boundary between the pre-rod space and the main rod space. Therefore, unlike in the example illustrated in FIGS. 2A and 2B, the voltage −(U+V cos ωt) is applied to the two main rod electrodes 5001 and 5003 located in the X-axis direction, and the voltage +(U+V cos ωt) is applied to the two main rod electrodes 5002 and 5004 located in the Y-axis direction. That is, the polarity of the voltage applied to the pre-rod electrodes 5011 to 5014 and the main rod electrodes 5001 to 5004 is switched between positive and negative. As a result, effects similar to those described above can be obtained.

Experimental Example

The inventors of the present invention have experimentally confirmed the effects obtained by configuring the rod electrodes of the pre-rod portion and the post-rod portion in the quadrupole mass filter as described above. In this experiment, PEG (polyethylene glycol) frequently used in sensitivity evaluation of LC-MS was used as a sample, and the ionic intensity was measured by a conventional mass spectrometer using a general pre-rod portion (or post-rod portion) and a mass spectrometer using the pre-rod portion (or post-rod portion) according to the present invention described above.

Figure 5:
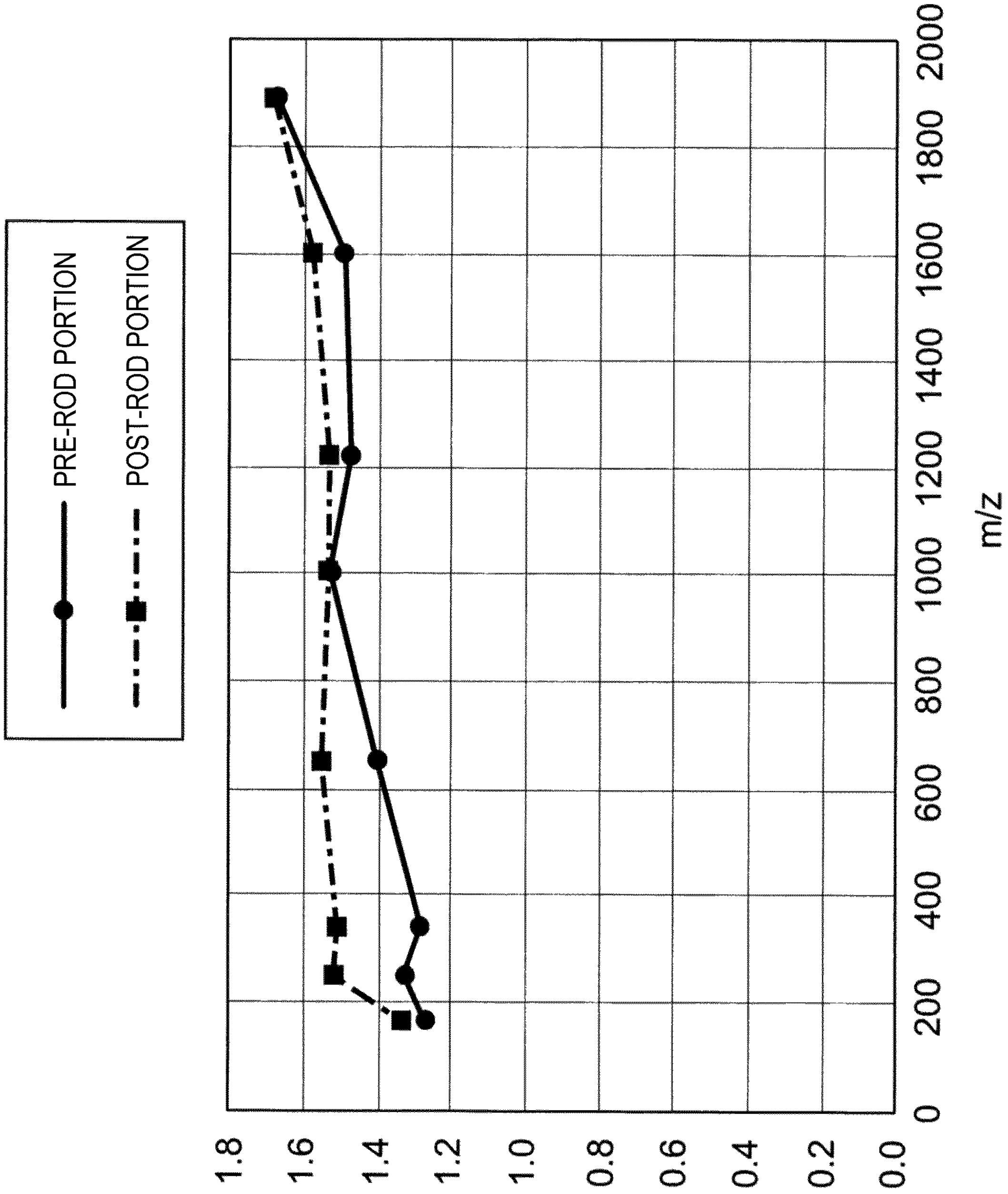
FIG. 5 is a view illustrating an ionic intensity increasing effect when the configuration of one mode of the present invention is adopted for a pre-rod portion and a post-rod portion.

FIG. 5 illustrates a result of calculating [ionic intensity in the mass spectrometer according to the present invention]/[ionic intensity in the conventional mass spectrometer] at a predetermined m/z value corresponding to PEG. FIG. 5 illustrates an example of the degree of improvement in ionic intensity, that is, sensitivity by using the present invention.

As found from FIG. 5, in the mass spectrometer using the pre-rod portion according to the present invention, the ionic intensity is about 1.3 to 1.7 times higher over a wide m/z range than in the mass spectrometer using the conventional pre-rod portion. The post-rod portion was also evaluated in the same manner, and the mass spectrometer using the post-rod portion according to the present invention has higher ionic intensity than the conventional mass spectrometer using the post-rod portion by about 1.3 to 1.7 times over a wide m/z range. This improvement in the ionic intensity means that the overall ion passing efficiency is improved in the quadrupole mass filter, and the effects of the present invention can be confirmed.

The above embodiment is merely an example of the present invention, and it is obvious that modifications, additions, and corrections appropriately made within the scope of the gist of the present invention are included in the claims of the present application.

For example, the above embodiment is a triple quadrupole mass spectrometer using a quadrupole mass filter including a pre-rod portion and a post-rod portion having characteristic configurations, but it is obvious that the present invention can also be applied to a single-type quadrupole mass spectrometer or a quadrupole-time-of-flight mass spectrometer. In addition, the ion source of the mass spectrometer is not limited to the atmospheric pressure ion source, and ion sources by various ionization methods generally used in mass spectrometers can be used.

Various Modes

It is understood by those skilled in the art that the exemplary embodiments described above are specific examples of the following modes.

(Clause 1) One mode of a quadrupole mass spectrometer according to the present invention includes a quadrupole mass filter configured to separate ions to be measured according to a mass-to-charge ratio, the quadrupole mass filter including:

a main rod portion including four main rod electrodes disposed to surround an ion optical axis;

a pre-rod portion including four pre-rod electrodes respectively disposed in front of the four main rod electrodes along the ion optical axis, where, at an end opposite to the main rod portion, the four pre-rod electrodes are disposed so as to be aligned on an inscribed circle having the same radius centered on the ion optical axis, and, at the other end facing the main rod portion, two pre-rod electrodes facing each other across the ion optical axis and the other two pre-rod electrodes are disposed so as to be aligned on an inscribed circle having different radii centered on the ion optical axis;

a first voltage applying unit configured to apply, to each of the four main rod electrodes, a voltage created by superimposing a DC voltage and an RF voltage according to a mass-to-charge ratio of ions to be allowed to pass; and a second voltage applying unit configured to apply an RF voltage having the same frequency as the RF voltage to each of the four pre-rod electrodes.

(Clause 6) Another mode of a quadrupole mass spectrometer according to the present invention includes a quadrupole mass filter configured to separate ions to be measured according to a mass-to-charge ratio, the quadrupole mass filter including:

a main rod portion including four main rod electrodes disposed to surround an ion optical axis;

a post-rod portion including four post-rod electrodes respectively disposed in rear of the four main rod electrodes along the ion optical axis, where, at an end opposite to the main rod portion, the four post-rod electrodes are disposed so as to be aligned on an inscribed circle having the same radius centered on the ion optical axis, and, at an end facing the main rod portion, two post-rod electrodes facing each other across the ion optical axis and the other two post-rod electrodes are disposed so as to be aligned on an inscribed circle having different radii centered on the ion optical;

a first voltage applying unit configured to apply, to each of the four main rod electrodes, a voltage created by superimposing a DC voltage and an RF voltage according to a mass-to-charge ratio of ions to be allowed to pass; and a second voltage applying unit configured to apply an RF voltage having the same frequency as the RF voltage to each of the four prost rod electrodes.

As a matter of course, it is possible to include both the pre-rod portion in the quadrupole mass spectrometer according to Clause 1 and the post-rod portion in the quadrupole mass spectrometer according to Clause 6.

In the above two modes of the quadrupole mass spectrometer according to the present invention, the ion passing efficiency is improved in any of: an inlet region where ions enter the pre-rod portion, a boundary region where ions move from the pre-rod portion to the main rod portion, a boundary region where ions move from the main rod portion to the post-rod portion, and an outlet region where ions exit from the post-rod portion. As a result, the overall ion passing efficiency of the quadrupole mass filter is improved, and the analysis sensitivity can be improved as compared with the conventional mass spectrometer. In addition, in the above two modes of the quadrupole mass spectrometer according to the present invention, it is not necessary to prepare a plurality of types of RF voltages to be applied to the rod electrodes included in the pre-rod portion and the post-rod portion, and thus the power supply unit is not complicated, and it is possible to avoid both an increase in size and weight of the power supply unit and an increase in cost. In addition, special machining or formation in manufacturing is not required for the main rod electrodes, and thus an increase in cost can also be avoided in that respect.

(Clause 2) In the quadrupole mass spectrometer according to Clause 1, diameters of the four main rod electrodes and diameters of the four pre-rod electrodes may be the same.

(Clause 7) In the quadrupole mass spectrometer according to Clause 6, diameters of the four main rod electrodes and diameters of the four post-rod electrodes may be the same.

With the quadrupole mass spectrometer described in Clause 2 or 7, the main rod electrodes and the pre-rod electrodes or the post-rod electrodes can have the same cross-sectional shape, which is advantageous in suppressing cost.

(Clause 3) In the quadrupole mass spectrometer according to Clause 2, at least two pre-rod electrodes facing each other across the ion optical axis among the four pre-rod electrodes may be divided into a plurality of segments along an extending direction of the ion optical axis, and a segment positioned on a side opposite to the main rod portion and a segment on a side facing the main rod portion may be disposed with a stepwise dislocation in a radial direction.

(Clause 8) In the quadrupole mass spectrometer according to Clause 7, at least two post-rod electrodes facing each other across the ion optical axis among the four post-rod electrodes may be divided into a plurality of segments along an extending direction of the ion optical axis, and a segment positioned on a side opposite to the main rod portion and a segment on a side facing the main rod portion may be disposed with a stepwise dislocation in a radial direction.

In the quadrupole mass spectrometer according to Clause 3 or 8, the pre-rod electrodes or the post-rod electrodes divided into a plurality of segments are disposed with a stepwise dislocation in the radial direction so as to have electrical connection between the plurality of segments. Therefore, the plurality of segments are substantially one pre-rod electrode.

With the quadrupole mass spectrometer described in Clause 3 or 8, the radius of the inscribed circle of the pre-rod electrodes or the post-rod electrodes can be adjusted by the magnitude of the stepwise dislocation between the segments in the pre-rod electrodes or the post-rod electrodes. In addition, the position of the pre-rod electrodes or the post-rod electrodes can be determined so as to be parallel to the main rod electrodes, and thus it is easy to assemble the rod electrodes and to ensure assembly accuracy.

(Clause 4) In the quadrupole mass spectrometer according to Clause 3, the four pre-rod electrodes may be arranged such that: at an end opposite to the main rod portion, the four pre-rod electrodes are aligned on a second inscribed circle having the same radius as a first inscribed circle on which the four main rod electrodes are aligned, and at an end facing the main rod portion, a first set of two pre-rod electrodes facing each other across the ion optical axis are aligned on an inscribed circle having a larger radius than the second inscribed circle or having the same radius as the second inscribed circle, and a second set of the other two pre-rod electrodes are aligned on an inscribed circle having a smaller radius than the second inscribed circle.

(Clause 5) In the quadrupole mass spectrometer according to Clause 4, the second set of pre-rod electrodes may be electrodes disposed in front of the main rod electrodes to which a DC voltage having the same polarity as a polarity of ions to be passed is applied along the ion optical axis.

(Clause 9) In the mass spectrometer according to Clause 8, the four post-rod electrodes may be arranged such that: at an end opposite to the main rod portion, the four pre-rod electrodes are aligned on a second inscribed circle having the same radius as a first inscribed circle on which the four main rod electrodes are aligned, and at an end facing the main rod portion, a first set of two post-rod electrodes facing each other across the ion optical axis are aligned on an inscribed circle having a larger radius than the second inscribed circle or having the same radius as the second inscribed circle, and a second set of the other two post-rod electrodes are aligned on an inscribed circle having a smaller radius than the second inscribed circle.

(Clause 10) In the mass spectrometer according to Clause 9, the second set of post-rod electrodes may be electrodes disposed in rear of the main rod electrodes to which a DC voltage having the same polarity as a polarity of ions to be passed is applied along the ion optical axis.

With the quadrupole mass spectrometers described in Clauses 4, 5, 9, and 10, the ion passing efficiency can be improved with a simple structure, that is, while suppressing the cost.

REFERENCE SIGNS LIST

1 . . . Vacuum Chamber
2 . . . First Intermediate Vacuum Chamber
3 . . . Second Intermediate Vacuum Chamber
4 . . . Third Intermediate Vacuum Chamber
5 . . . Analysis Chamber
20, 30, 40, 52 . . . Ion Guide
21 . . . Skimmer
50 . . . Front Quadrupole Mass Filter
500 . . . Main Rod Portion
5001, 5002, 5003, 5004 . . . Main Rod Electrode
501 . . . Pre-Rod Portion
501A . . . First Segment Portion
501B . . . Second Segment Portion
5011, 5012, 5013, 5014 . . . Pre-Rod Electrode
5011A, 5012A, 5013A, 5014A . . . First Segment
5011B, 5012B, 5013B, 5014B . . . Second Segment
502 . . . Post-Rod Portion
502A . . . First Segment Portion
502B . . . Second Segment Portion
5021, 5022, 5023, 5024 . . . Post-Rod Electrode
5021A, 5022A, 5023A, 5024A . . . First Segment
5021B, 5022B, 5023B, 5024B . . . Second Segment
51 . . . Collision Cell
53 . . . Rear Quadrupole Mass Filter
530 . . . Main Rod Portion
531 . . . Pre-Rod Portion
54 . . . Ion Detector
55 . . . Partition Wall
55*a* . . . Aperture
6 . . . Ionizer
60 . . . Ionization Chamber
61 . . . ESI Probe
62 . . . Desolvation Tube
7 . . . Power Supply Unit
8 . . . Control Unit
C . . . Ion Optical Axis

The invention claimed is:

1. A quadrupole mass spectrometer comprising a quadrupole mass filter configured to separate ions to be measured according to a mass-to-charge ratio, the quadrupole mass filter including:

a main rod portion including four main rod electrodes disposed to surround an ion optical axis;

a pre-rod portion including four pre-rod electrodes respectively disposed in front of the four main rod electrodes along the ion optical axis, where, at an end opposite to the main rod portion, the four pre-rod electrodes are disposed so as to be aligned on an inscribed circle having a same radius centered on the ion optical axis, and, at an end side facing the main rod portion, two pre-rod electrodes facing each other across the ion optical axis and the other two pre-rod electrodes are disposed so as to be aligned on an inscribed circle having different radii centered on the ion optical axis;

a main voltage applying unit configured to apply, to each of the four main rod electrodes, a voltage created by superimposing a DC voltage and an RF voltage according to a mass-to-charge ratio of ions to be allowed to pass; and a pre-voltage applying unit configured to apply an RF voltage having a same frequency as the RF voltage to each of the four pre-rod electrodes.

2. The quadrupole mass spectrometer according to claim 1, wherein the four pre-rod electrodes have a same diameter.

3. The quadrupole mass spectrometer according to claim 2, wherein at least two pre-rod electrodes facing each other across the ion optical axis among the four pre-rod electrodes are divided into a plurality of segments along an extending direction of the ion optical axis, and a segment positioned on a side opposite to the main rod portion and a segment on a side facing the main rod portion are disposed with a stepwise dislocation in a radial direction.

4. The quadrupole mass spectrometer according to claim 3, wherein the four pre-rod electrodes are arranged such that: at an end opposite to the main rod portion, the four pre-rod electrodes are aligned on a second inscribed circle having a same radius as a first inscribed circle with which the four main rod electrodes are in contact, and at an end facing the main rod portion, a first set of two pre-rod electrodes facing each other across the ion optical axis are aligned on an inscribed circle having a larger radius than the second inscribed circle or having a same radius as the second inscribed circle, and a second set of the other two pre-rod electrodes are aligned on an inscribed circle having a smaller radius than the second inscribed circle.

5. The quadrupole mass spectrometer according to claim 4, wherein the second set of pre-rod electrodes are electrodes disposed in front of main rod electrodes to which a DC voltage having a same polarity as a polarity of ions to be passed is applied along the ion optical axis.

6. A quadrupole mass spectrometer comprising a quadrupole mass filter configured to separate ions to be measured according to a mass-to-charge ratio, the quadrupole mass filter including:

a main rod portion including four main rod electrodes disposed to surround an ion optical axis;

a post-rod portion including four post-rod electrodes respectively disposed in rear of the four main rod electrodes along the ion optical axis, where, at an end opposite to the main rod portion, the four post-rod electrodes are disposed so as to be aligned on an inscribed circle having a same radius centered on the ion optical axis, and, at an end facing the main rod portion, two post-rod electrodes facing each other across the ion optical axis and the other two post-rod electrodes are disposed so as to be aligned on an inscribed circle having different radii centered on the ion optical axis;

a main voltage applying unit configured to apply, to each of the four main rod electrodes, a voltage created by superimposing a DC voltage and an RF voltage according to a mass-to-charge ratio of ions to be allowed to pass; and a post voltage applying unit configured to apply an RF voltage having a same frequency as the RF voltage to each of the four post rod electrodes.

7. The quadrupole mass spectrometer according to claim 5, wherein the four post-rod electrodes have a same diameter.

8. The quadrupole mass spectrometer according to claim 7, wherein at least two post-rod electrodes facing each other across the ion optical axis among the four post-rod electrodes are divided into a plurality of segments along an extending direction of the ion optical axis, and a segment positioned on a side opposite to the main rod portion and a segment on a side facing the main rod portion are disposed with a stepwise displacement in a radial direction.

9. The quadrupole mass spectrometer according to claim 8, wherein the four post-rod electrodes are arranged such that: at an end opposite to the main rod portion, the four post-rod electrodes are aligned on a second inscribed circle having a same radius as a first inscribed circle on which the four main rod electrodes are aligned, and, at an end facing the main rod portion, a first set of two pre-rod electrodes facing each other across the ion optical axis are aligned on an inscribed circle having a larger radius than the second inscribed circle or having a same radius as the second inscribed circle, and a second set of the other two post-rod electrodes are aligned on an inscribed circle having a smaller radius than the second inscribed circle.

10. The quadrupole mass spectrometer according to claim 9, wherein the second set of post-rod electrodes are electrodes disposed in rear of main rod electrodes to which a DC voltage having a same polarity as a polarity of ions to be passed is applied along the ion optical axis.

* * * * *